United States Patent
Utter

(10) Patent No.: US 10,334,975 B2
(45) Date of Patent: Jul. 2, 2019

(54) RACK SYSTEM FOR STORAGE AND ACCESS OF RE-SEALABLE BAGS

(71) Applicant: John David Utter, Macomb, IL (US)

(72) Inventor: John David Utter, Macomb, IL (US)

( * ) Notice: Subject to any disclaimer, the term of this patent is extended or adjusted under 35 U.S.C. 154(b) by 0 days.

(21) Appl. No.: 15/812,820

(22) Filed: Nov. 14, 2017

(65) Prior Publication Data
US 2018/0064292 A1 Mar. 8, 2018

Related U.S. Application Data

(63) Continuation of application No. 15/351,110, filed on Nov. 14, 2016, now Pat. No. 9,820,617.

(60) Provisional application No. 62/255,122, filed on Nov. 13, 2015.

(51) Int. Cl.
*A47G 29/00* (2006.01)
*F16B 2/10* (2006.01)

(52) U.S. Cl.
CPC ............. *A47G 29/00* (2013.01); *F16B 2/10* (2013.01)

(58) Field of Classification Search
CPC .... A47J 47/16; F16B 2/22; F16B 2/10; A47G 29/00; A47B 81/00; B65D 33/1675; Y10T 24/153; Y10T 24/155; A47F 7/285
USPC ...................................................... 211/85.15
See application file for complete search history.

(56) References Cited

U.S. PATENT DOCUMENTS

| | | | |
|---|---|---|---|
| 3,412,965 A * | 11/1968 | Alexander .......... | B65B 67/1244 248/101 |
| 3,754,771 A | 8/1973 | Shagoury | |
| 3,800,503 A | 4/1974 | Maki | |
| 4,296,529 A * | 10/1981 | Brown ............... | B65D 33/1675 24/30.5 P |
| 4,832,290 A | 5/1989 | Baglio | |
| 4,871,264 A * | 10/1989 | Robbins, III ...... | B65D 33/1666 294/137 |
| 5,062,534 A * | 11/1991 | Neustat .................... | A47F 7/163 211/47 |
| 5,226,734 A | 7/1993 | Scott et al. | |
| 5,371,925 A * | 12/1994 | Sawatsky ............. | B65D 33/004 24/30.5 R |
| 5,513,823 A | 5/1996 | Bresnahan | |
| 5,586,665 A * | 12/1996 | Brousseau .............. | A47F 7/285 193/12 |
| 5,695,074 A * | 12/1997 | Wiese ....................... | A47F 1/12 211/59.2 |
| 5,695,075 A * | 12/1997 | Flum ......................... | A47F 1/12 211/59.2 |

(Continued)

*Primary Examiner* — Ko H Chan
(74) *Attorney, Agent, or Firm* — Hamilton IP Law, PC; Jay R. Hamilton; Charles A. Damschen

(57) ABSTRACT

A method and device for hanging a storage bag having a re-sealable mechanical seal having a clip with a generally elongate enclosure of the storage bag proximate the re-sealable mechanical seal. The clip arms are flexibly connected to a living hinge for enclosure of a storage bag which may be slid into and out of the rack via the interiorly positioned opposing parallel rails by contact between the lower side of the clip arms and the upper surface of the opposing rails. The clip arms and opposing parallel rails of the rack may be configured with recesses or ridges to lock the position of the clips within the rack during use. A top carrier aperture allows insertion of a carrier rod allowing multiple racks to be adjacently positioned. The rack may be configured with a fastener aperture to allow attachment of the rack to other structures.

6 Claims, 21 Drawing Sheets

(56) References Cited

U.S. PATENT DOCUMENTS

| | | | |
|---|---|---|---|
| 5,706,957 A * | 1/1998 | Hardy | A47F 1/12 211/59.2 |
| 5,960,957 A | 10/1999 | Johnson | |
| 6,059,125 A * | 5/2000 | Parham | A47F 73/00 211/162 |
| 6,279,204 B1 | 8/2001 | Gonzalez | |
| 6,360,901 B1 * | 3/2002 | Parham | A47F 7/285 211/162 |
| D479,683 S | 9/2003 | Turvey et al. | |
| 7,040,582 B2 * | 5/2006 | Rosler | B65D 33/14 248/101 |
| D606,860 S * | 12/2009 | Hill | D9/434 |
| 8,215,500 B2 | 7/2012 | Constantine | |
| 2005/0173600 A1 | 8/2005 | Morris | |

\* cited by examiner

RACK SYSTEM FOR STORAGE AND ACCESS OF RE-SEALABLE BAGS

CROSS REFERENCE TO RELATED APPLICATIONS

This application is a continuation of and claims benefit of utility non-provisional patent application. Ser. No. 15/351,110 filed on Nov. 14, 2016 which claimed benefit of provisional Pat. App. No. 62/255,122 filed on Nov. 13, 2015, all of which are incorporated by reference herein in their entireties.

FIELD OF INVENTION

Systems and methods for organization of hanging bags, including re-sealable bags, as commonly used by professionals and consumers for organization, storage and transport of common items such as fasteners and nails or food, including fresh fruit and vegetables or leftovers, which users may seek to organize, store, transport and or access.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX (NOT APPLICABLE) AUTHORIZATION PURSUANT TO 37 C.F.R. § 1.171 (d)(c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Re-sealable storage bags with mechanical closure means, such as those described in U.S. Pat. No. 5,403,094, the disclosure of which is hereby incorporated by reference, are widely used in today's households. They can be used to store both food and non-food items. They are often used to store smaller servings of food items in a refrigerator or a freezer.

One drawback of such re-sealable bags is that when full, they themselves can consume a disproportionate amount of shelf space when stored in cupboard, pantry, refrigerator, freezer, or the like. This is due to the fact when these bags are stored, they often lie flat. It is often undesirable to stack other items on top of these bags, because that may result in flattening on the item(s) stored in the bag, or the added weight may force the bag open, thereby spilling its contents (e.g. spaghetti) on the shelf. Moreover, it will be appreciated that while a resealable bag lies flat on a shelf, the vertical space above the bag is essentially wasted. U.S. Pat. No. 8,215,500 "Hanging device for resealable storage bags", incorporated by reference herein, exemplifies the prior art attempting to solve the problem of organizing re-sealable bags for easy access.

SUMMARY OF DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The designs and concepts as disclosed improves on the design disclosed in U.S. Pat. No. 8,215,500 (incorporated by reference herein) by providing a reusable clip system for engagement with each re-sealable bag and a housing that supports engagement with multiple re-sealable bags having clips attached therein. One of ordinary skill will appreciate that any article that may be stored in a re-sealable bag may be used in combination with the system disclosed.

An embodiment of the present invention disclosed herein includes a clip for re-usable engagement of a re-sealable bag, the clip having a size and shape allowing it to engage a re-sealable bag and fit within a rack having a pair of rails.

Another embodiment of the present invention disclosed herein is the method and structure of using the novel clip, particularly with a rack having a pair of rails sized and shaped to allow insertion and engagement with the clip as disclosed herein.

Another embodiment of the present invention disclosed herein is the method and structure of assembling a rack having at least one and/or a multitude of parallel rails which may be assembled from a kit having a combination of parts therein including a plurality of end caps and frame pieces sized and shaped and to engage with and cooperatively work together to form multiple racks which may be used and configured individually or together. As disclosed and discussed, the combination of parts may also be sold together pre-assembled into a housing having at least one and/or a multitude of parallel rails therein forming multiple racks within a single housing. Anyone of the presently disclosed embodiments may be installed within, for example, a refrigerator, a cupboard, a set of shelves, a garage or the like. Also, several of the above devices may be attached to form a system of hanging devices.

BRIEF DESCRIPTION OF THE DRAWINGS

The accompanying drawings, which are incorporated in and constitute a part of this specification, illustrate embodiments and together with the description, serve to explain the principles of the Rack System for Storage and Access of Re-sealable Bags 10 (hereinafter referred to simply as the "rack") as disclosed herein.

FIG. 10E-1 is an end view of one embodiment of a single rack as illustrated in FIGS. 4-9B and FIGS. 10A-10E having a fastener inserted in the fastener aperture of the retainer portion.

DETAILED DESCRIPTION—ELEMENT LISTING

Figure 1:
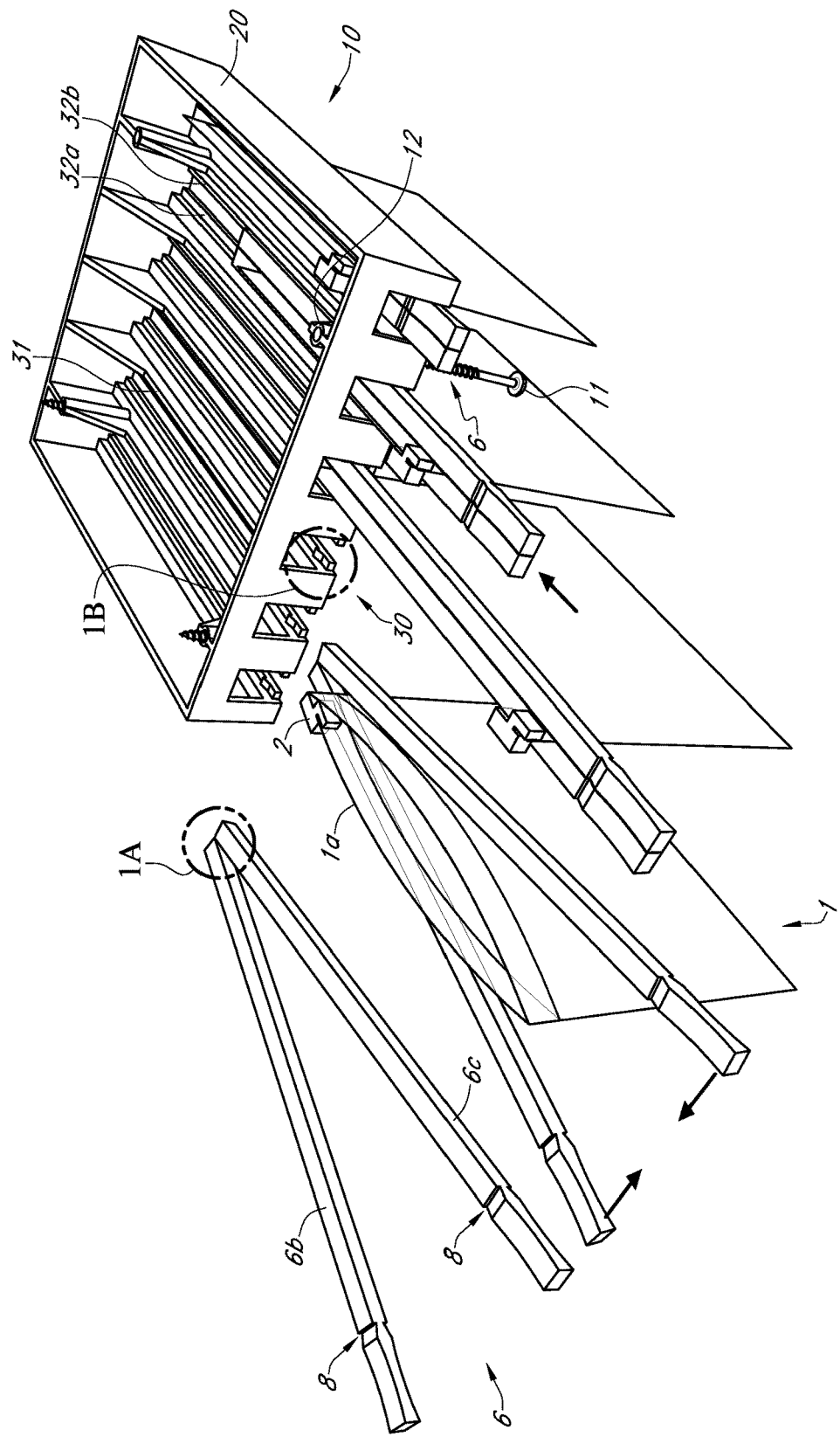
FIG. 1 provides a front perspective view of one embodiment of rack 10 configured as a housing having multiple retainer openings therein for engagement with multiple clips. As called out by letters therein (A-E), re-sealable bags 1 are shown in various positions of engagement with the rack 10 to illustrate a method of using the rack disclosed.

| Description | Element No. |
| --- | --- |
| Re-sealable bag | 1 |
| Upper portion-above mechanical zipper | 1a |
| Upper portion-above mechanical zipper | 1b |
| Mechanical zipper | 2 |
| | 3 |
| | 4 |
| | 5 |
| Clip | 6 |
| Living hinge | 6a |
| Clip arm-$1^{st}$ | 6b |
| Clip arm-$2^{nd}$ | 6c |
| Ridge-clip arm | 7 |
| First edge | 7a |
| Second edge | 7b |
| Recess-clip arm | 8 |
| Alignment bump (face) | 9a |

-continued

| Description | Element No. |
| --- | --- |
| Alignment recess (face) | 9b |
| Rack System for Storage and Access of Re-sealable Bags | 10 |
| Attachment fastener | 11 |
| Attachment aperture | 12 |
| | 15 |
| | 17 |
| | 18 |
| | 19 |
| Housing (main unit) | 20 |
| Front wall | 21 |
| Side wall | 22 |
| Back wall | 23 |
| | 24 |
| | 25 |
| Retainer opening | 30 |
| Support member | 31 |
| Rails | 31 |
| Rail-$1^{st}$ | 32a |
| Rail-$2^{nd}$ | 32b |
| Ridge (notch) | 33 |
| Channel | 34 |
| | 35 |
| | 36 |
| | 38 |
| Center portion | 40 |
| Center portion-first end | 40a |
| Center portion-second end | 40b |
| Walls | 42 |
| Inner opposing rails | 44 |
| Inner opposing rails-first | 44a |
| Inner opposing rails-second | 44b |
| Upper interior | 46 |
| Lower interior | 48 |
| Retainer portion | 50 |
| Wall | 52 |
| Inner opening | 54 |
| Top surface | 56 |
| | 58 |
| Legs-retainer portion | 60 |
| Leg-first | 60a |
| Leg-second | 60b |
| Opening-outer | 62 |
| Outer opposing rails | 64 |
| Outer opposing rails-first | 64a |
| Outer opposing rails-second | 64b |
| Locking rail gap | 66 |
| | 68 |
| Top carrier aperture | 70 |
| Carrier rod | 72 |

DETAILED DESCRIPTION

Before the present rack 10 is disclosed and described, it is to be understood that the rack 10 is not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed rack 10 and method of storing and accessing re-sealable bags 2 for storage and use. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all racks 10. This applies to all aspects of this application including, but not limited to, components of a rack 10. Thus, if there are a variety of additional components that can be added it is understood that each of these additional components can be added with any specific embodiment or combination of embodiments of the rack 10. The present rack 10 may be understood more readily by reference to the following detailed description of preferred embodiments and the examples included therein and to the Figures and their previous and following description.

In one embodiment, the rack 10 may be constructed of material of sufficient strength and durability to support engagement with multiple re-sealable bags filled with items therein. It is contemplated that in the illustrative embodiment shown in the enclosed figures may be constructed of, but not limited to, any metal or combination of metals including bronze, steel and aluminum; plastics or carbon fiber including Kevlar®, foam-blown polyurethane, thermoplastic polyurethane, ethylene vinyl acetate, other polymers, other thermoplastics, carbon rubber, blown rubber polymers, composite materials, natural materials (e.g., rubber, leather, etc.), elastomers, combinations thereof, and/or any other material with suitable characteristics (e.g., compressive strength, stability, elasticity, density).

Figure 2:
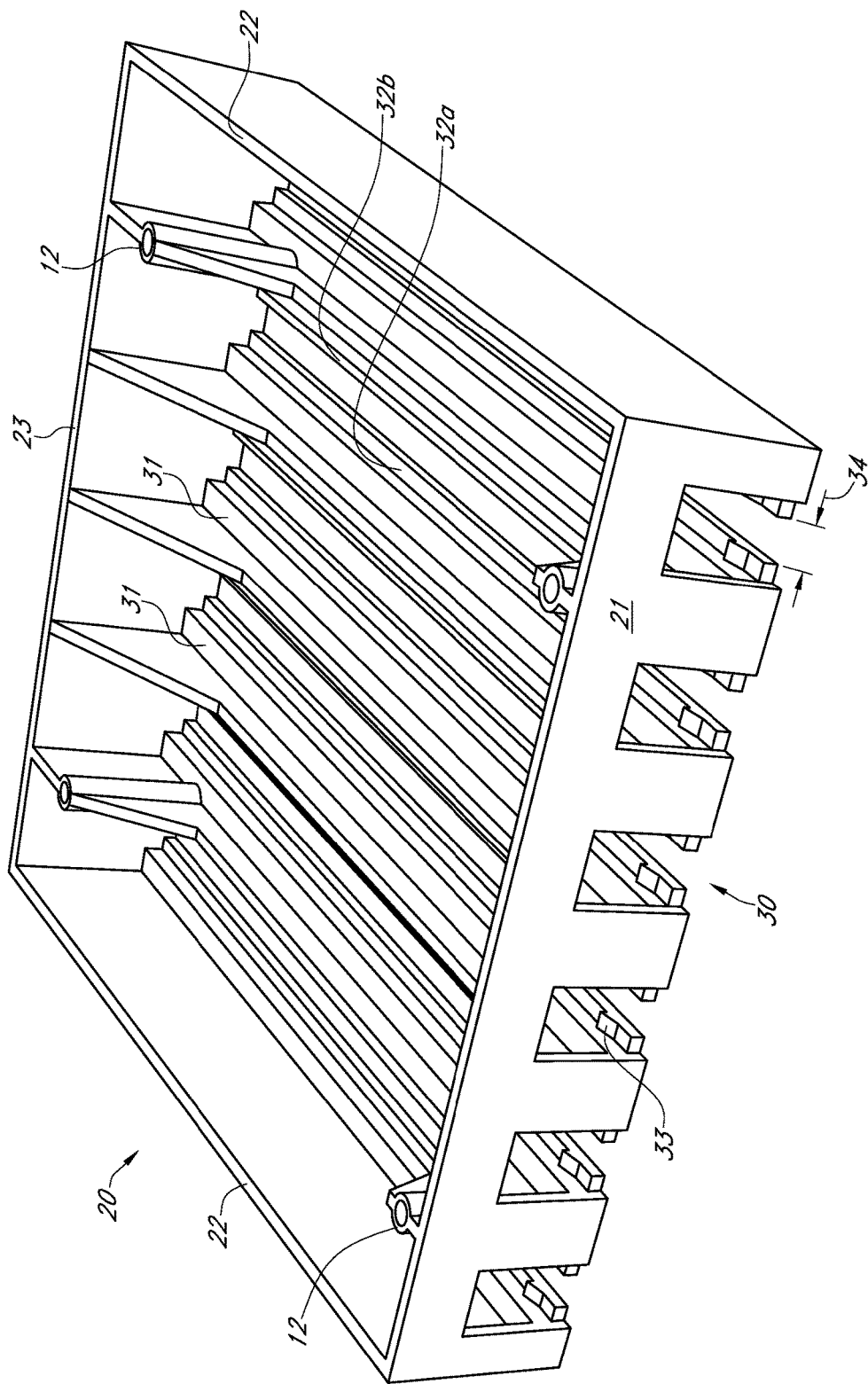
FIG. 2 provides a front view of an illustrative embodiment of the housing 20 of the rack 10 disclosed herein.

FIG. 1 provides a front perspective view of another embodiment of rack 10 configured as a housing 20 having multiple retainer openings 30 therein for engagement with multiple clips 6. As called out by letters therein (A-E), re-sealable bags 1 are shown in various positions of engagement with the housing 20 of the rack 10 to illustrate a method of using the rack 10 as a system as disclosed. FIG. 2 provides a detailed view of FIG. 1 with the clips 6 and re-sealable bags 1 removed to better illustrate the features and structure of one illustrative embodiment of the rack housing 20 disclosed herein.

Figure 1A:
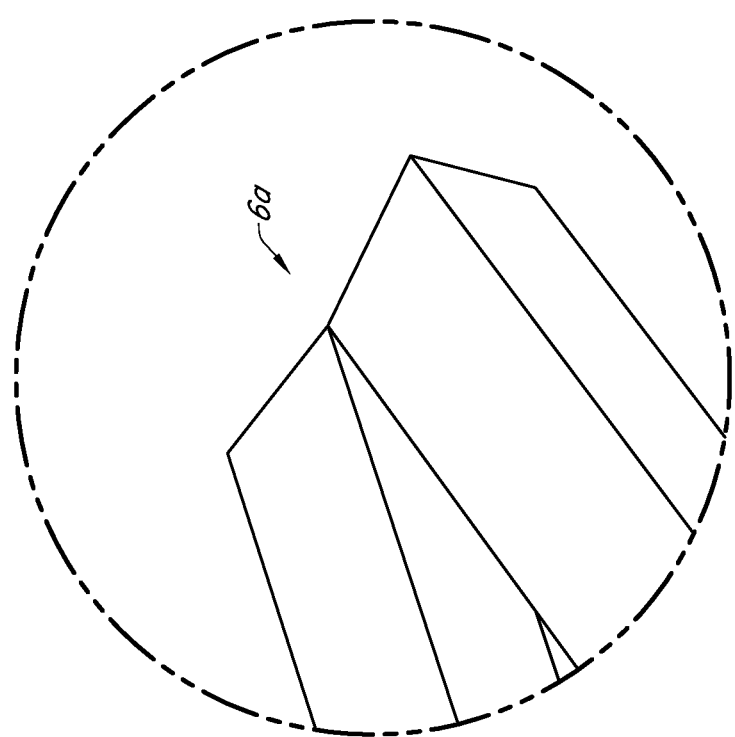
FIG. 1A is a detailed view of the living hinge of a clip to be used with at least one of the embodiment rack disclosed herein.

As shown at A, clip 6 is comprised of a living hinge 6a having a pair of arms (6b, 6c) therein. (See detail FIG. 1A) As shown at A, the pair of opposing hinge arms (6a, 6b) are open. As called out, the living hinge 6a may be constructed from polypropylene. One of ordinary skill will appreciate that the clip 6 and the living hinge 6a may be constructed of material of sufficient strength and durability to support engagement with re-sealable bags filled with items therein. It is contemplated that in the illustrative embodiment shown in the enclosed figures may be constructed of, but not limited to, any metal or combination of metals including bronze, steel and aluminum; plastics or carbon fiber including Kevlar®, foam-blown polyurethane, thermoplastic polyurethane, ethylene vinyl acetate, other polymers, other thermoplastics, carbon rubber, blown rubber polymers, composite materials, natural materials (e.g., rubber, leather, etc.), elastomers, combinations thereof, and/or any other material with suitable characteristics (e.g., compressive strength, stability, elasticity, density).

Figure 3:
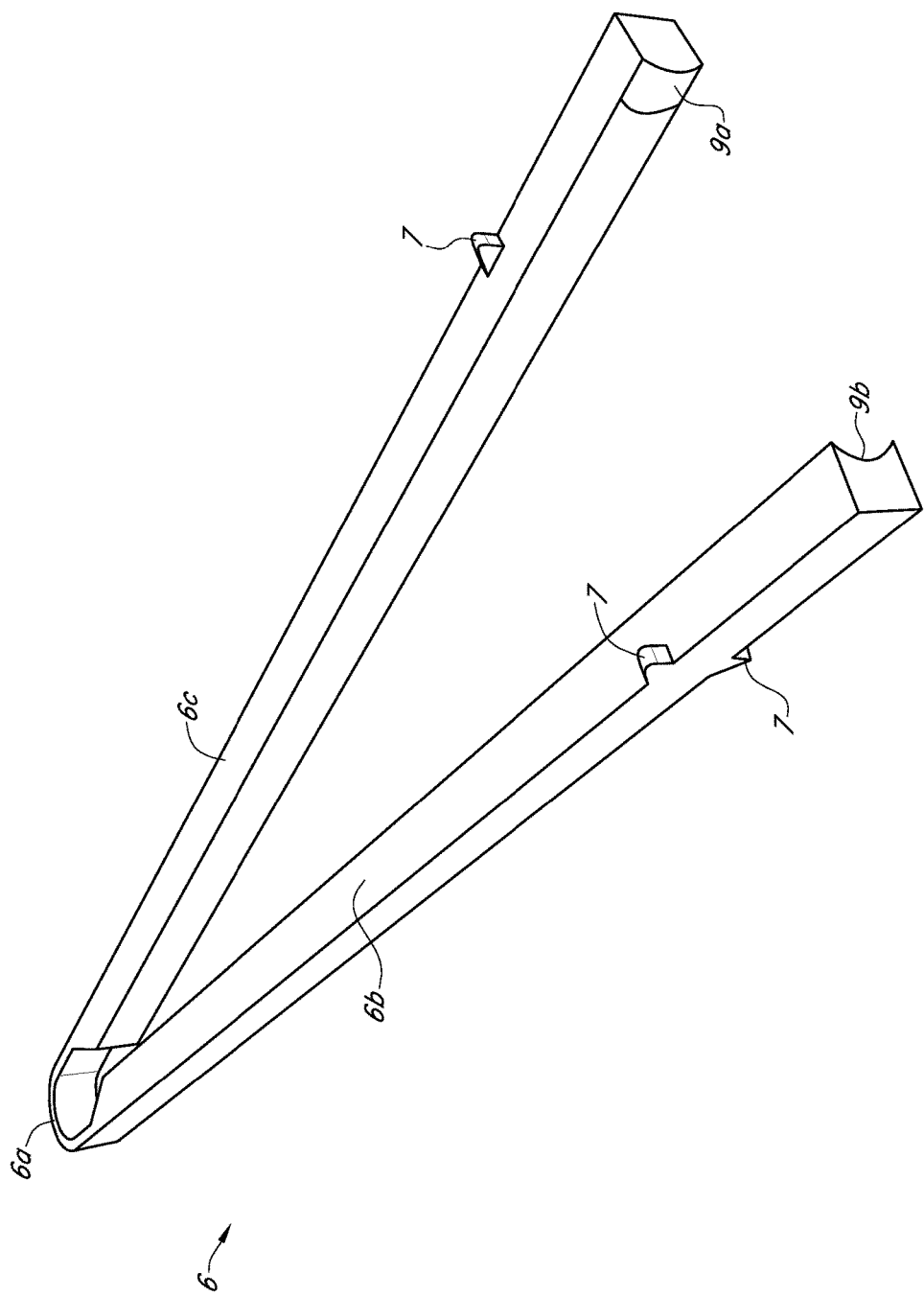
FIG. 3 is a perspective view of another embodiment of the clip which may be used in the various embodiments of the rack disclosed herein.
Figure 3A:
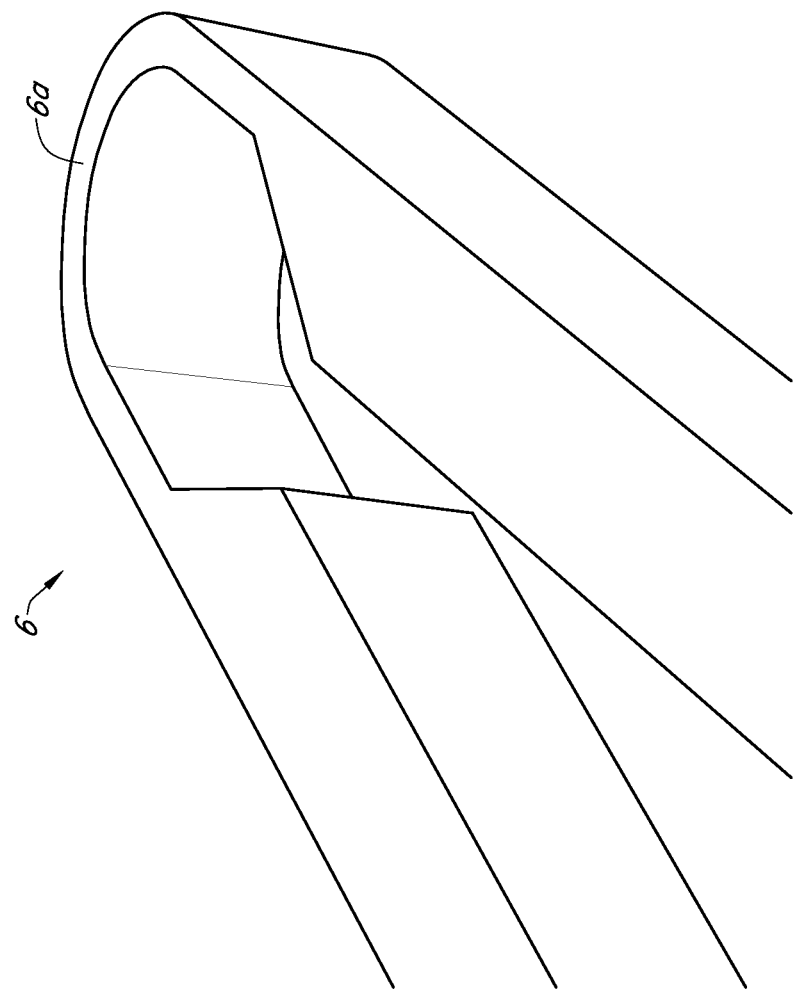
FIG. 3A is a perspective view of the clip disclosed at FIG. 3 illustrating one embodiment of a living hinge.
Figure 3B:
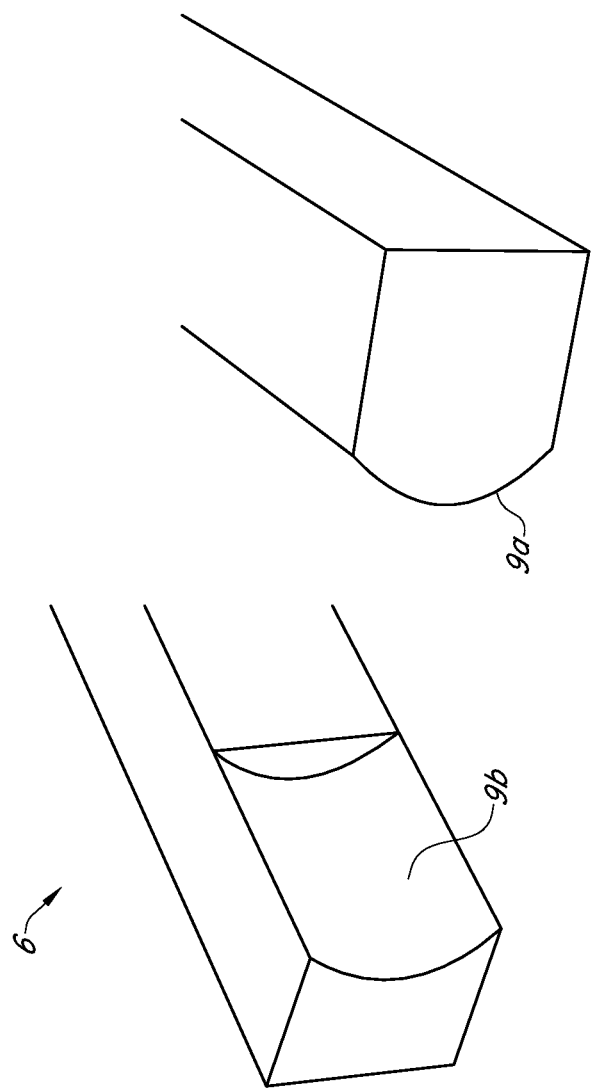
FIG. 3B is a perspective view of the clip disclosed at FIG. 3 illustrating one embodiment of the distal ends of the clip arms of the clip.

As shown then at B, re-sealable bag 1 is positioned interior the clip 6 so that the pair of opposing arms (6b, 6c) surround and engage with the perimeter of the re-sealable bag 1 proximate the mechanical zipper 2. The distal ends of the opposing arms (6b, 6c) (opposite end from the living hinge 6a) are configured so that they may be pushed or pressed together by the user. As one of ordinary skill will appreciate the opposing faces of the distal ends may also be configured with an alignment bump and recess (9a, 9b) as shown at FIGS. 1, 3 and 3B so that the distal ends may be aligned to mate or "snap" together. One of ordinary skill will understand that in addition to the alignment recesses and bumps (9a/9b) shown, various grooves and bumps or combinations therein may be affixed or built into the opposing faces of distal ends of the clip arms (6b,6c). As shown at B of FIG. 1, it is NOT required that the hinge arms (6b, 6c) snap together and there are certain advantages for the ends to not snap together including ease of the use as discussed further herein. Upon engagement of clip 6 with re-sealable bag 1, the clip 6 may now be positioned for slideable engagement with and positioning in a rack 10 via retainer opening 30 in housing 20. As shown in FIG. 1 B, C and D, the clip 6 enters the retainer opening 30 "living hinge" 6a end first and is generally surrounded by the rack 10 and housing 20 resting on rails (32a, 32b) with only a portion of the distal end sticking out of the housing. (See FIG. 1 at E)

Figure 1B:
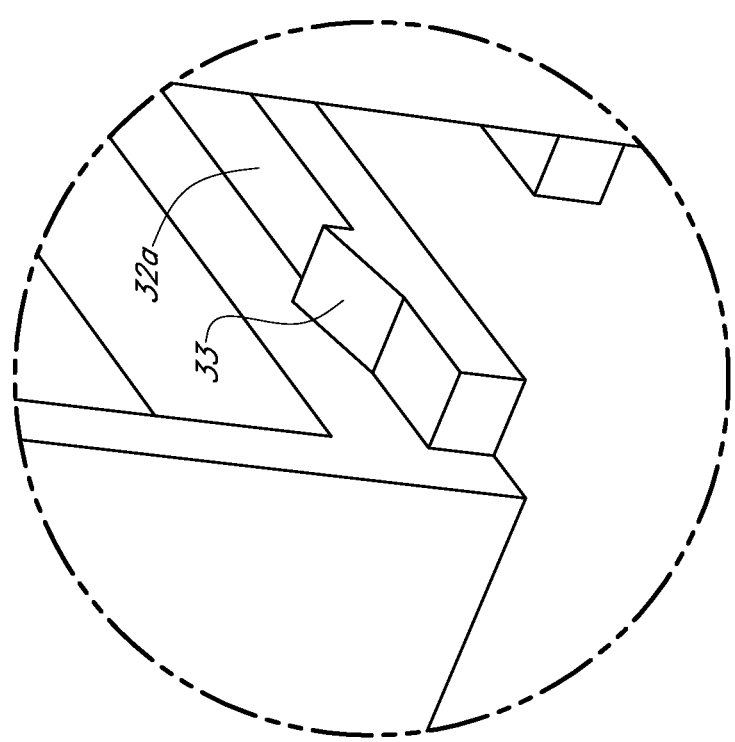
FIG. 1B is a detailed interior view of a portion of one rail of an embodiment of the rack as disclosed herein.

As disclosed in further detail at FIG. 1 and FIG. 1B, in one embodiment the clip arms (6b, 6c) may be configured with a recess 8 such that the general size and shape of the clip 6 allow it to engage with the rails (32a,32b) having a ridge 33 therein positioned for cooperable engagement with the recess 7 of clip 6 to "lock" or hold the position of the clip 6 in rack 10 within housing 20. As disclosed and discussed further herein, one of ordinary skill will appreciate that clip 6 could be constructed with a ridge 7 and rail 32 of rack 10 with a recess to lock and/or hold the clip 6 within the rack 10 during use without departure from the spirit and intent of the present disclosure. See discussion infra for FIGS. 3-10E-1 and discussion of clip arm ridge 7 and locking rail gap 66. One of ordinary skill will appreciate that clip arm ridge 7 may be replaced with a clip arm recess 8 allowing the present disclosure to work with a rail notch (ridge) such as illustrated by 33 instead of locking rail gap 66 without departure from the spirt and intent of the present disclosure.

As shown in FIG. 1 for one embodiment of the rack 10, the housing 20 is configured as four (4) walls with a front wall 21, side walls 22 and back wall 23. Each retainer opening 30 comprises at least one opening in the front wall 21 with a support 31 affixed between the front wall 21 and the back wall 23 creating open channels 34 across the dimension of the front wall 21 therein. (See FIG. 2 also) Further, the support member 31 is configured with a rail (32a, 32b) on each side facing the interior of the channel 34 formed in the retainer opening 30. The retainer openings 30 in the front wall 21 are configured to be of sufficient dimension as to allow the clip 6 to enter and rest therein as shown in FIG. 1 at positions C, D and E. The retainer openings 30 in the front wall are configured to be of sufficient dimension as to allow the clip 6 to enter the retainer opening 30 and channel 34, slide along the rails (32a, 32b) positioned therein along the support 31 from the retainer opening in the front wall 20 to the back wall 23 of housing. As shown, the engagement and contact between the clip 6 and the top and interior faces of the rails 31 positioned along the sides of the channel 34 formed in the housing 20 press against the clip arms (6a, 6b) keeping the clip 6 engaged with the re-sealable bag 1. (See FIGS. 1, position D and E)

One of ordinary skill will note that the present disclosure is an improvement over the system disclosed in U.S. Pat. No. 8,215,500 (hereinafter "the '500 patent"), at least because the re-sealable bag in the '500 patent has to be "fed" or "threaded" into the holding device as illustrated through-out and particularly at FIG. 3 of the '500 patent. The present disclosure improves upon this design because the re-sealable bag 1 does not have to be fed or threaded into a holding device and may be left sitting on a flat surface and the clip 6 placed "over" or engaged with the re-sealable bag 1 as previously disclosed and illustrated in FIGS. 1, 1A, 1B and 2 of the present disclosure.

The clip 6 is then inserted into the body of housing 20 via retainer opening 30 which then, by design, holds the clip 6 firmly on the re-sealable bag 1 by exerting stationary force on the sides of the clip 6. The clip 6 can be used to feed the re-sealable bag 1 into the housing at retainer opening 30 without using both hands and having to move other bags aside to achieve getting it into the housing 20 where a plurality of bags are positioned since the re-sealable bag 1 is already "in" the clip 6 before it is inserted into the housing 20, thus eliminating the "feeding" of the loose, flexible bag into a slot.

Typically the clip 6, retainer opening 30 and channel 34 are of sufficient dimension to allow entry of the clip into the retainer opening 30 and make contact therein between the rails (32a, 32b) and the clip 6 allowing for a "snug" fit between the clip 6 and re-sealable bag 1 for sufficient hanging support within the housing 20 of rack 10. Typically, the clearance of the opening down the center of the clip 6 is in the range of 0.002-0.004 inches with the preferred dimension of the opening being 0.003 inch with the clip inserted in the channel 34 thus allowing the bag 1 to hang in the clip 6 but not allowing the mechanical zipper 2 to pass through the opening thus suspending the bag from the housing 20. As shown in FIG. 1, the clip 6 typically has a dimension of 0.25 inches in thickness (height), 9.5 inches in length and 0.625 inches in width (closed and inserted in channel 34). The channel 34 has a width of 0.625 inches which is the same as the width of the clip 6, leaving the preferred 0.003 inch gap for the bag 1. The housing 20 has a width of 7.25 inches, a length (depth) of 9 inches and height of 1.5 inches. Each rail (32a, 32b) extends out from the support member approximately 0.16 inches providing a surface approximately 0.32 inches wide for contact, support, and engagement with the clip arms (6a, 6b) inserted therein.

As shown in FIGS. 1, 1A, 1B and 2, the housing 20 has six (6) retainer openings positioned therein creating six (6) racks 10 thereby allowing engagement and support with up to six (6) clip/bag combinations therein at any one time. One of ordinary skill will appreciate that the preceding dimensions are provided to enable an illustrative embodiment of the rack 10 as disclosed herein. Accordingly, the specific design, pattern, dimensions, and/or configuration of the rack 10, housing 20, rails 32, channel 34 and clip 6 in no way limit the scope of the rack 10 for storage and access of re-sealable bags unless so indicated in the following claims.

As shown in FIGS. 1, 1A, 1B and 2, the housing 20 is configured with multiple fastener apertures 11 which are basically formed to allow insertion and engagement with a fastener 12 therein to allow mounting of the housing 20 to any suitable surface which may include, but is not limited to, the underside of a shelf (Not shown) The specific pattern, dimensions, configuration, etc. of the features of the fastener apertures 12 may vary from one embodiment of the housing 20 of rack 10 to the next and are therefore in no way limiting to the scope of the rack 10 unless so indicated in the following claims.

Figure 3C:
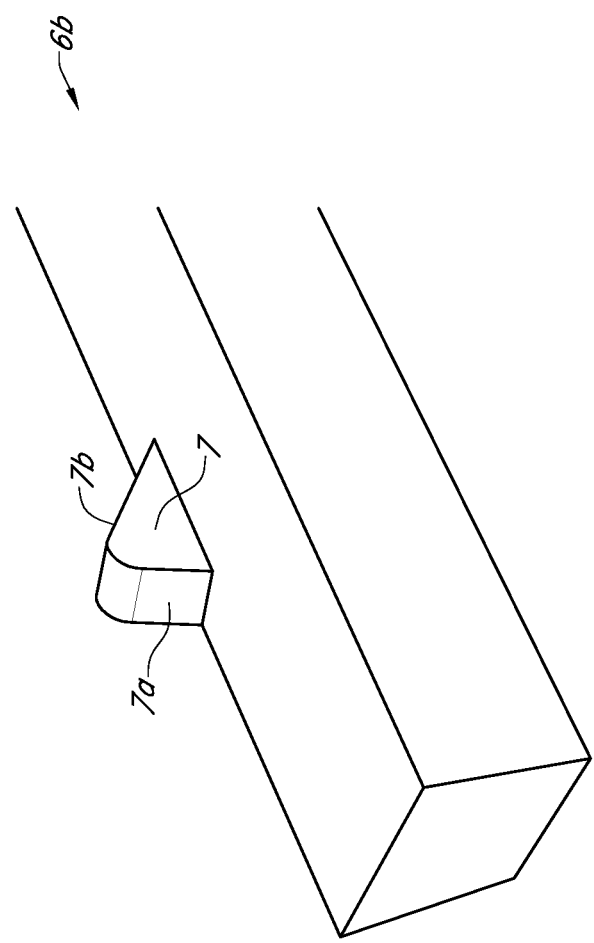
FIG. 3C is perspective view of the clip arm of the clip as disclosed at FIG. 3 illustrating one embodiment of a clip arm ridge.

FIG. 3 is a perspective view of another embodiment of the clip 6 which may be used in the various embodiments of the rack 10 disclosed herein. FIG. 3A is a perspective view of the embodiment of the clip 6 disclosed at FIG. 3 providing additional detail of the living hinge 6a. FIG. 3B is a perspective view of the clip 6 disclosed at FIG. 3 illustrating one embodiment of the distal ends of the clip arms (6b, 6c) of the clip 6. FIG. 3C is a perspective view of the clip arm 6b of the clip 6 as disclosed at FIG. 3 illustrating one embodiment of a clip arm ridge 7. As shown, the clip 6 has a ridge 7 affixed therein towards the distal end of each arm (6b, 6c). As shown the ridge 7 has a first side 7a nearer the distal end which forms a ninety-degree angle to the surface of the clip arm 6b. The second side 7b which faces the living hinge end of the clip 6 forms a forty-five degree angle to the surface of the clip arm 6b. As shown, ridge 7 occupies only a portion of the width, typically one-third to one-half of the width of the clip arm (6b, 6c). One of ordinary skill will appreciate that other angles, positions and widths for the ridge 7 are possible as required by any particular use and application of the present disclosure without limitation or restriction.

Figure 4:
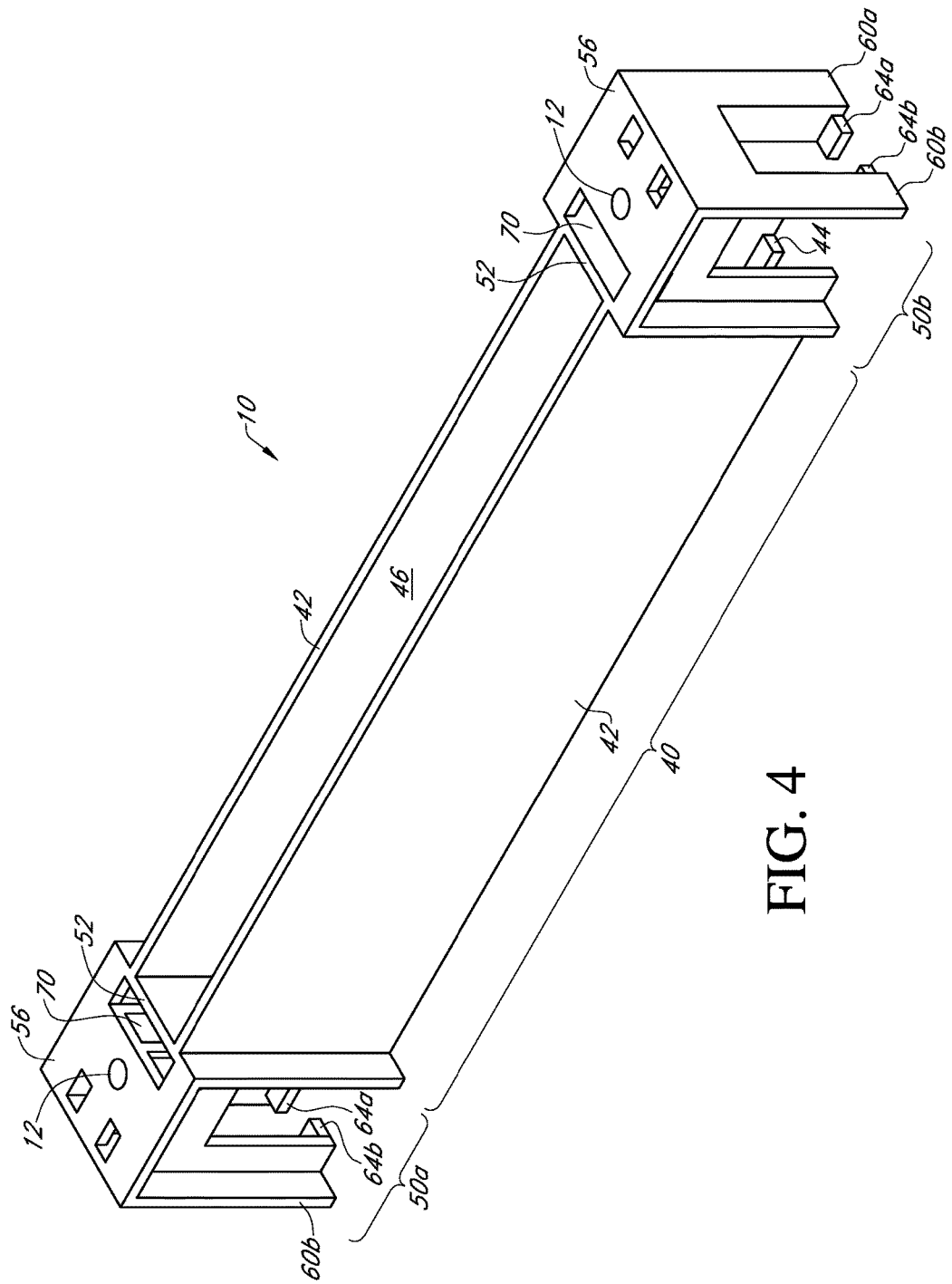
FIG. 4 is a perspective view of another illustrative embodiment of a single rack as disclosed herein.
Figure 5:
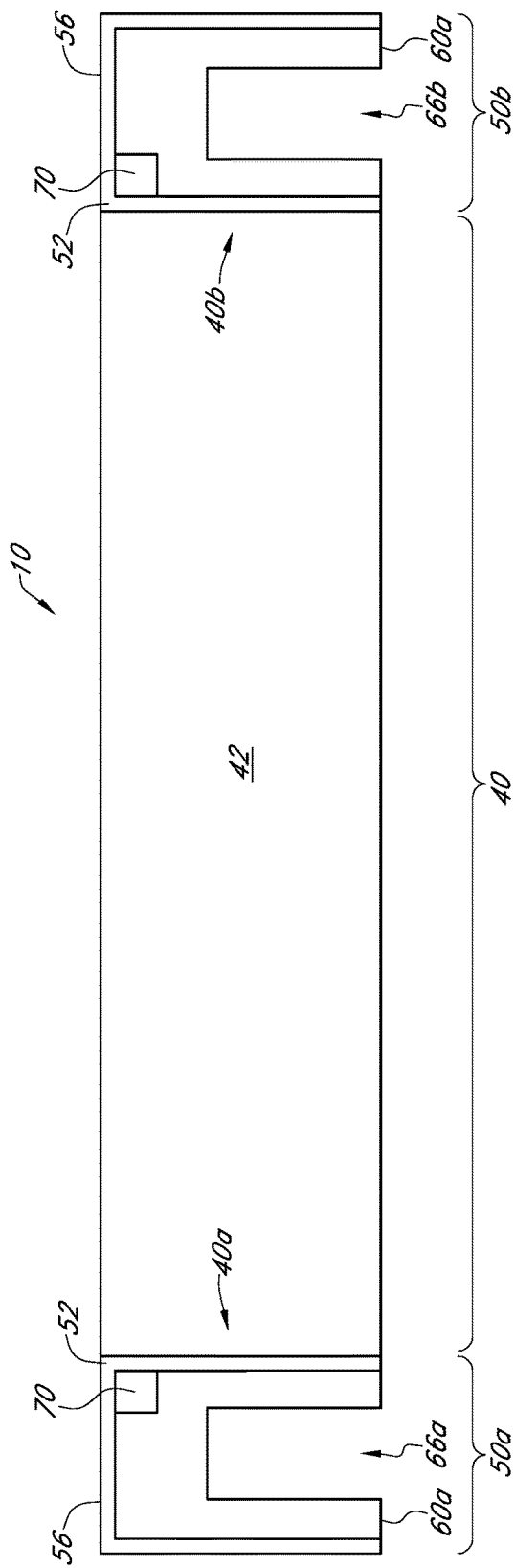
FIG. 5 is a side view of the embodiment of a single rack disclosed at FIG. 4.
Figure 6:
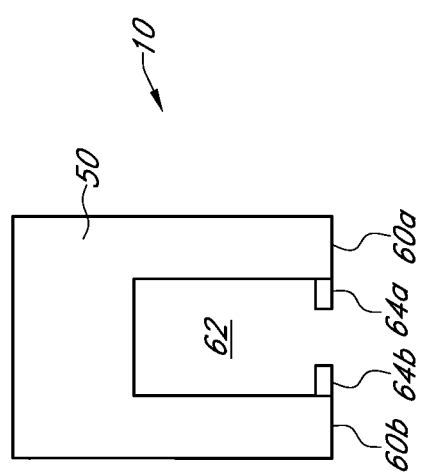
FIG. 6 is an end view of the embodiment of a single rack disclosed at FIGS. 4-5.
Figure 7:
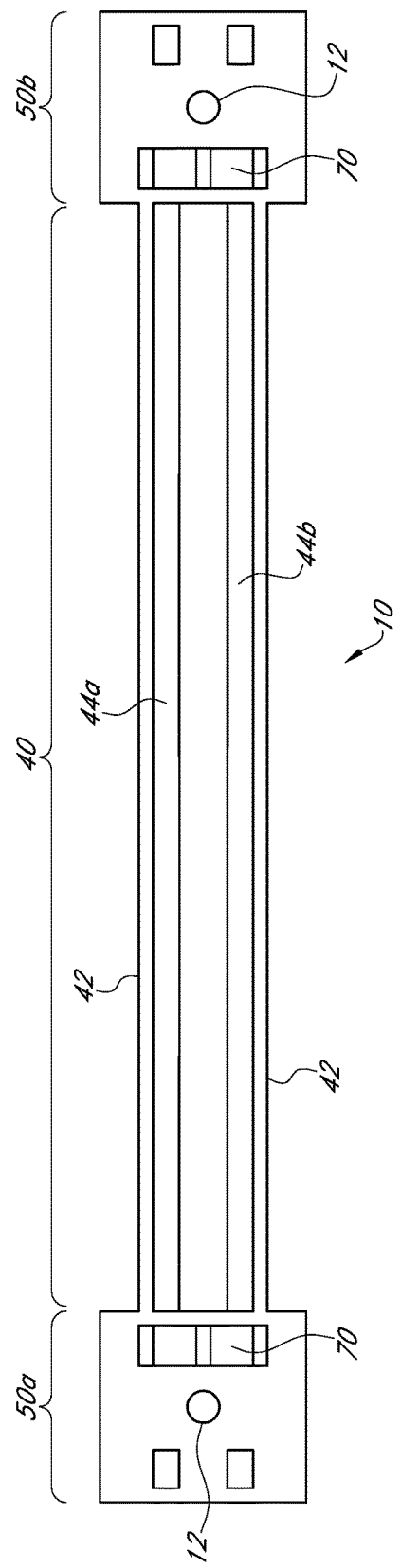
FIG. 7 top side view of one embodiment of a single rack disclosed herein at FIGS. 4-6.
Figure 8:
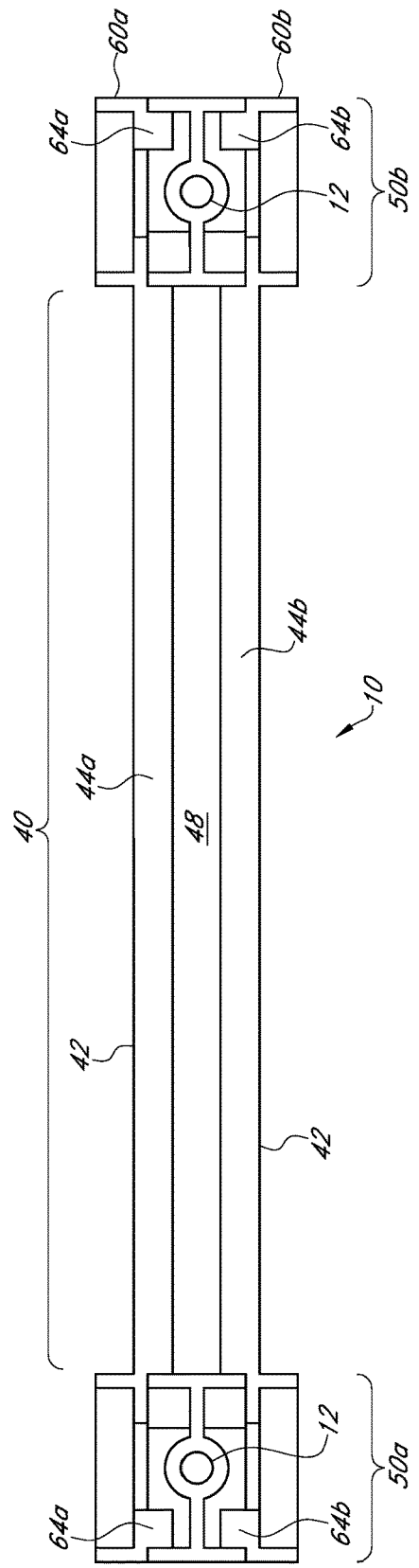
FIG. 8 is a bottom side view of one embodiment of a single rack disclosed herein at FIGS. 4-6.

FIG. 4 is a perspective view of another illustrative embodiment of the Rack System for Storage and Access of Re-sealable Bags (hereinafter "rack") wherein the rack 10 has been configured so it is modular and each individual rack 10, having a set of opposing rails for engagement with a clip 6 enclosing a storage bag 1, as previously shown in FIG. 1 and discussed in detail, does not require a fixed number of "racks" for engagement with a fixed number of storage bags. The advantage being that the user can purchase, place and use whatever number is suitable for a particular application as dictated by available space, the size of the storage bags, the space available for organization, etc. so that 1, 2, 5, 10 or 100 racks can be installed. Another advantage is the spacing between the racks is not fixed. For example, and without limitation or restriction, additional spacing may be incorporated between the racks 10 allowing for larger or fuller storage bags to be used without interfering with adjacent racks. Although the racks 10 shown through-out FIGS. 9-10 are typically shown adjacently spaced, multiple racks 10 are not limited to adjacent spacing and may be non-adjacently spaced, i.e. end to end or irregularly spaced (not shown) without limitation or restriction. FIG. 5 is a side view of the embodiment of a single rack 10 disclosed at FIG. 4, FIG. 6 is an end view and FIG. 7 is a top side view and FIG. 8 is a bottom side view. As shown, the rack 10 is a device for hanging a storage bag 1 having a re-sealable mechanical seal 2 via a clip 6, as previously shown at FIGS. 3-3C, having a generally elongate shape and including a first clip arm 6b, having a first end and a second end, and a second clip arm 6c, also having a first end and a second end, wherein the first end of the first clip arm 6b and the first end of the second arm 6c are flexibly connected via a living hinge 6a configured for an open position and a closed position, wherein in an open position the living hinge 6a is open and the first and second clip arms (6b,6c) are spread apart and wherein in a closed position the living hinge 6a is closed and the first and second clips arms (6b,6c) are nearly touching and parallel. A storage bag 1 having a re-sealable mechanical seal 2 may be positioned interior the first and second clip arms (6b,6c), as shown at FIG. 1, with the clip arms (6b,6c) positioned proximate to and under the mechanical re-sealable seal 2 in the open position and the storage bag 1 then enclosed by the clip 6 in the closed position. As shown in FIGS. 4-10E-1, the rack 10 further comprises a center portion 40 having a body with a first end and a second end with an exterior defined by a pair of opposing parallel walls 42, the lower interior of the center portion 48 defined by a pair of parallel inner opposing rails 44 therein and the upper interior of the center portion 46 open. As shown, the rack 10 is generally symmetrical and the center portion 40 has a retainer portion 50 at each end. Each retainer portion 50 also having a body with a first end, a second end and a top surface 56. The first end of the retainer portion 50 is formed as a wall 52 with an inner opening therein, the wall 52 connected to the center portion 50 and forming the center portion's end. The top surface 56 is connected to the wall 52 and extends from the first end to the second end wherein a pair of legs 60 define an outer opening 62 with a rail interiorly positioned at the end of the legs (64a, 64b), the pair of legs (60a, 60b) defining a pair of outer opposing rails (64a, 64b) aligned with the inner opposing rails of the center portion (44a, 44b), the outer opening 62 between the pair of legs 60 aligning with the open center portion and wherein a first pair of locking rail gaps 66a are formed by the termination of the outer opposing rails 64 of the first retainer portion 50a and a second pair of locking rail gaps 66b are formed by the termination of the outer opposing rails of the second retainer portion 50b, the first pair of locking rail gaps 66a positioned adjacent the first end of the center portion 40a and the second pair of locking rail gaps 66b positioned adjacent the second end of the center portion 40b as illustrated in FIGS. 4-6.

One of ordinary skill will recognize that the specific design, pattern, dimensions, and/or configuration of the clip 6, living hinge 6a, clip arms (6b,6c), clip ridge 7, clip recess 8, rack 10, center portion 40, inner opposing rails 44, upper interior 46, lower interior 48, retainer portion 50, wall 52, inner opening 54, top surface 56, retainer portion legs 60, outer opening 62, outer opposing rails 64 and locking rail gap 66 in no way limit the scope of the rack 10 for storage and access of re-sealable bags unless so indicated in the following claims.

As illustrated by FIG. 1, this embodiment of the rack 10 also allows for a storage bag 1 engaged in the clip 6 to be positioned for sliding entry and exit into and from the outer opening 62, between the legs of the retainer portion 60, the inner opening 46 into the center portion 40 first end, the inner opening from the center portion second end 46 and the opening between the legs 60 of the second retainer portion 50. As discussed and shown, the clip arms (6b,6c) rest on the first retainer outer opposing rails 64, the opposing rails of the center portion 44 and the second retainer outer opposing rails 64 during use of the rack 10 with the storage bag 1.

Figure 9A:
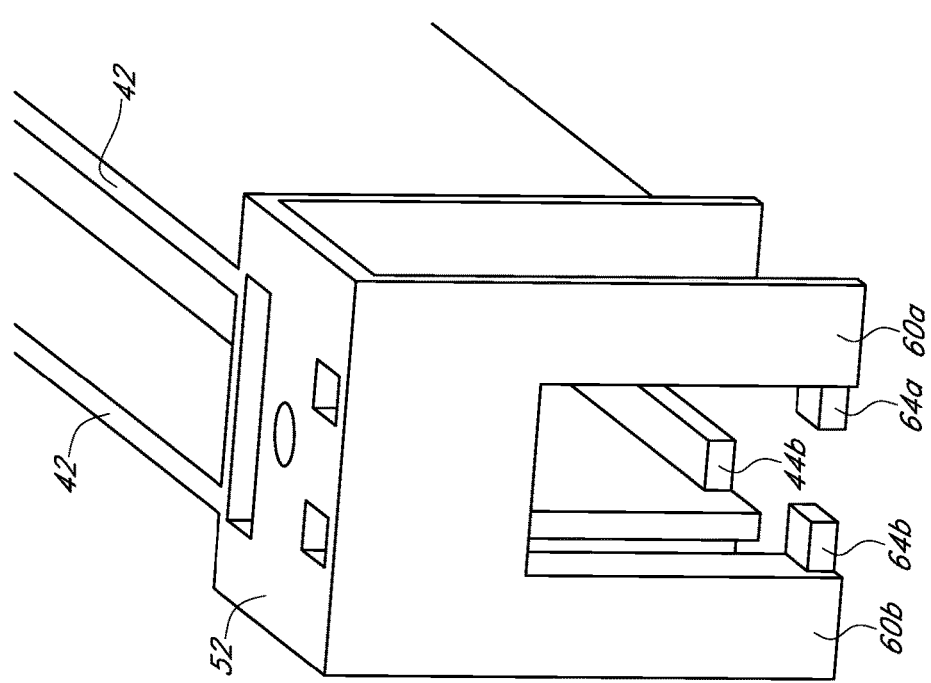
FIG. 9A is a top perspective view of an illustrative embodiment of a retainer portion for a single rack as disclosed at FIGS. 4-8.
Figure 9B:
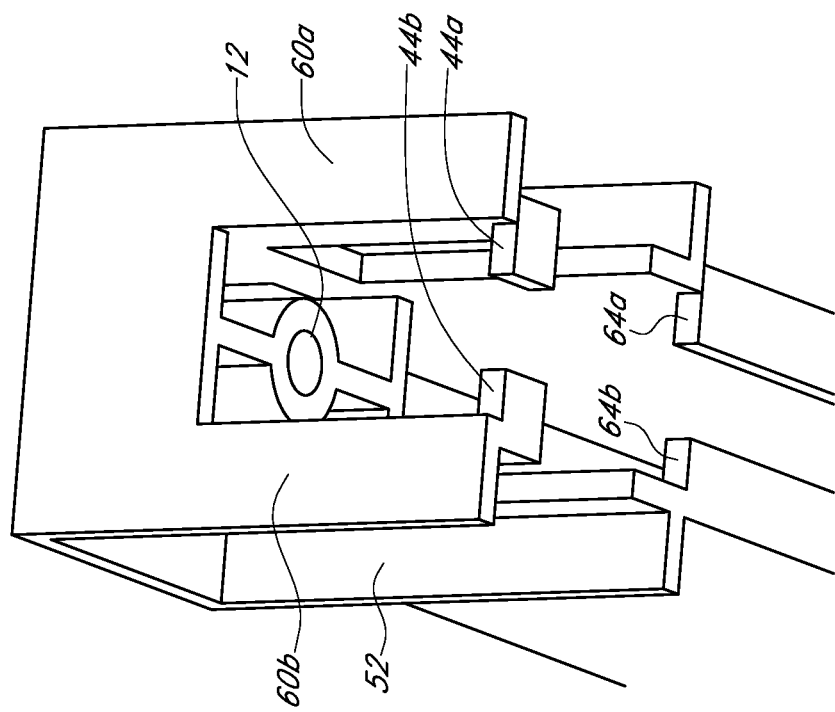
FIG. 9B is a bottom perspective view of an illustrative embodiment of a retainer portion for a single rack as disclosed at FIGS. 4-8.

FIG. 9A is a top perspective view of an illustrative embodiment of a retainer portion 50 for a single rack 10 as disclosed at FIGS. 4-8 and FIG. 9B is a bottom perspective view of an illustrative embodiment of a retainer portion 50 for a single rack 10 as disclosed at FIGS. 4-8. As shown in FIGS. 9A-9B, a fastener aperture 12 may be positioned in the retainer portion(s) 50 allowing attachment of the rack 10 to another structure. (not shown) See also FIG. 10E-1 which is an end view of one embodiment of a single rack 10 as illustrated in FIGS. 4-9B and FIGS. 10A-10E having a fastener 11 inserted in the fastener aperture 12 of the retainer portion 50.

A top carrier aperture 70 may also be positioned in the top surface 56 of both the first and second retainer portions 50, the top carrier aperture 70 transversely positioned in relation to the opposing inner and outer rails (44, 64) of the center portion 40 and retainer portion(s) 50 and configured to allow insertion of a carrier rod 72 thereby allowing multiple racks 10 to be adjacently positioned as illustrated in FIGS. 10A-10E.

Figure 10A:
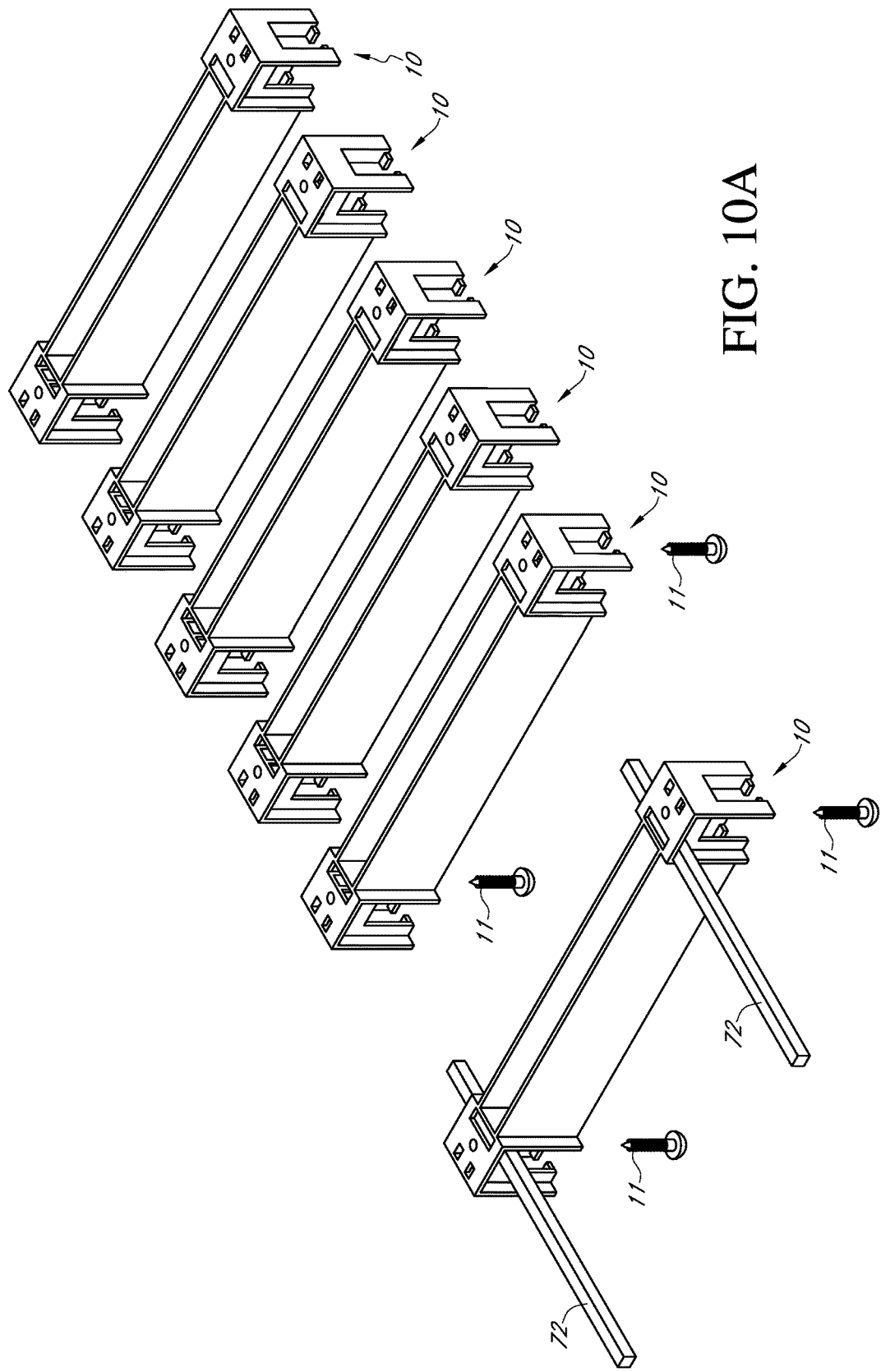
FIG. 10A is a perspective view of the embodiment disclosed at FIGS. 4-9B wherein one set of racks has been assembled and positioned on a pair of carrier rails via the top carrier rail slot.
Figure 10B:
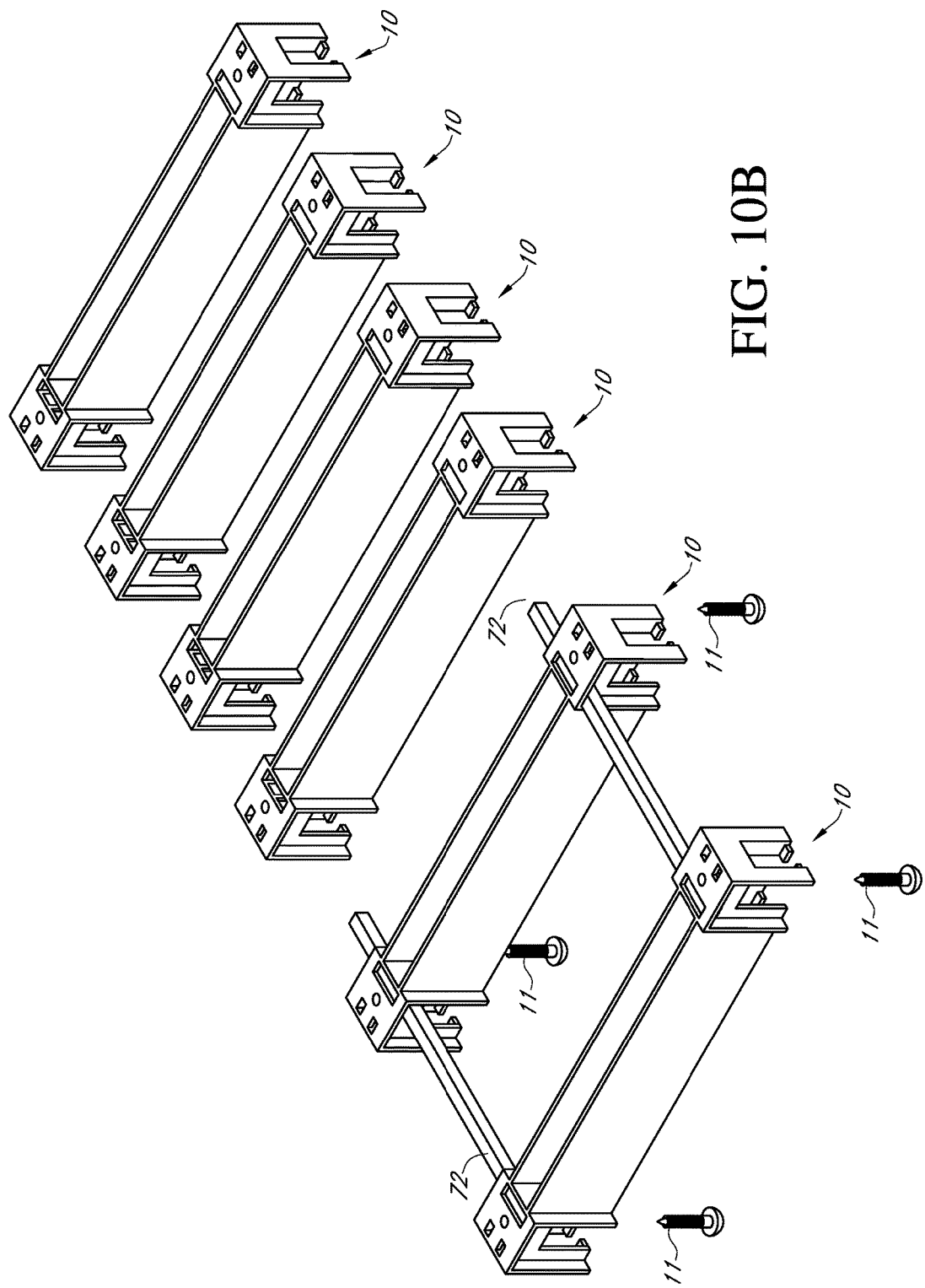
FIG. 10B is a perspective view as disclosed in FIG. 10A wherein two sets of racks have been assembled and positioned on a pair of carrier rails via the top carrier rail slot.
Figure 10C:
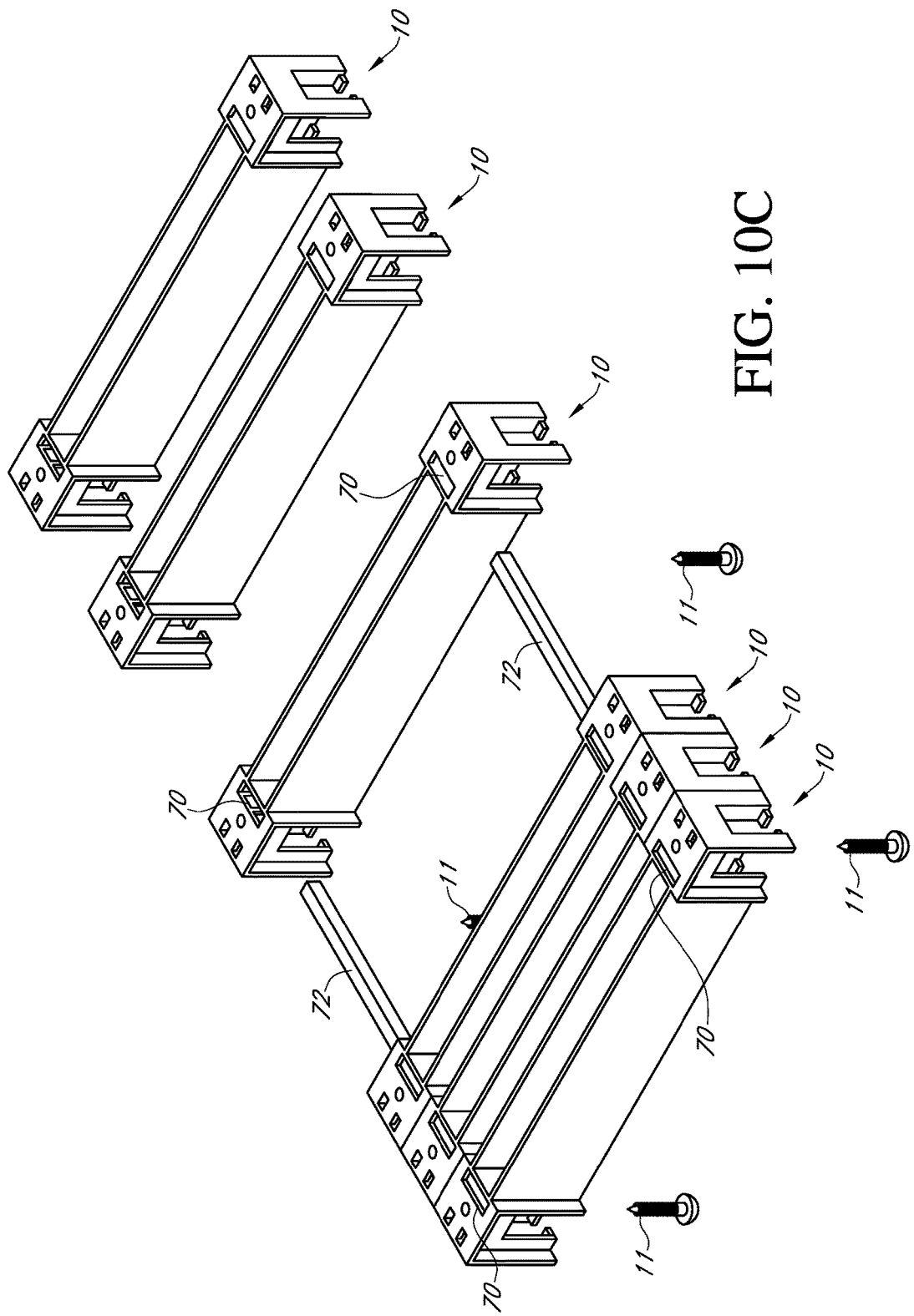
FIG. 10C is a perspective view as disclosed in FIGS. 10A-10B wherein three sets of racks have been assembled and positioned on a pair of carrier rails via the top carrier rail slot.

As shown, FIG. 10A is a perspective view of the embodiment disclosed at FIGS. 4-9B wherein one set of racks 10 has been assembled and positioned on a pair of carrier rails 72 via the top carrier rail aperture (slot) 70. FIG. 10B is a perspective view as disclosed in FIG. 10A wherein two sets of racks 10 have been assembled and positioned on a pair of carrier rails 72 via the top carrier rail aperture 70. FIG. 10C is a perspective view as disclosed in FIGS. 10A-10B wherein three sets of racks 10 have been assembled and positioned on a pair of carrier rails 72 via the top carrier rail aperture 70.

Figure 10D:
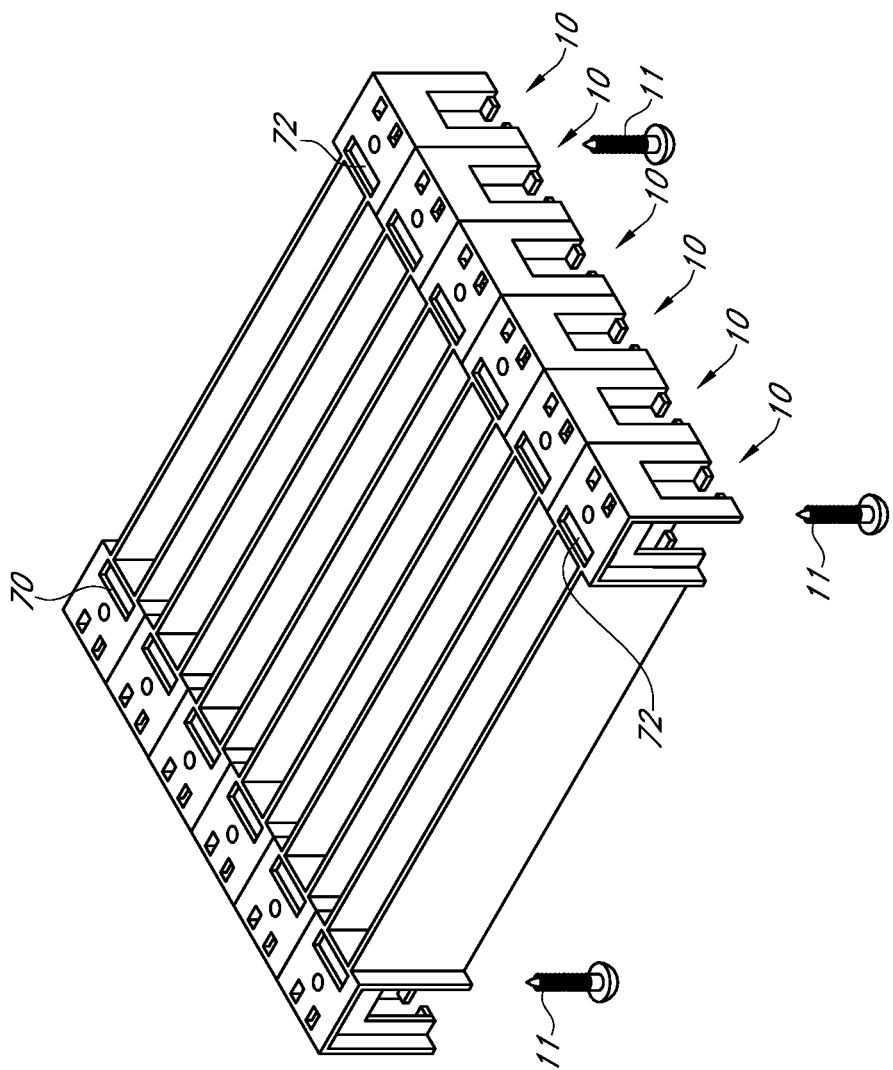
FIG. 10D is a perspective view as disclosed in FIGS. 10A-10C wherein six sets of rack have been assembled and positioned on a pair of carrier rails via the top carrier rail slot.
Figure 10E:
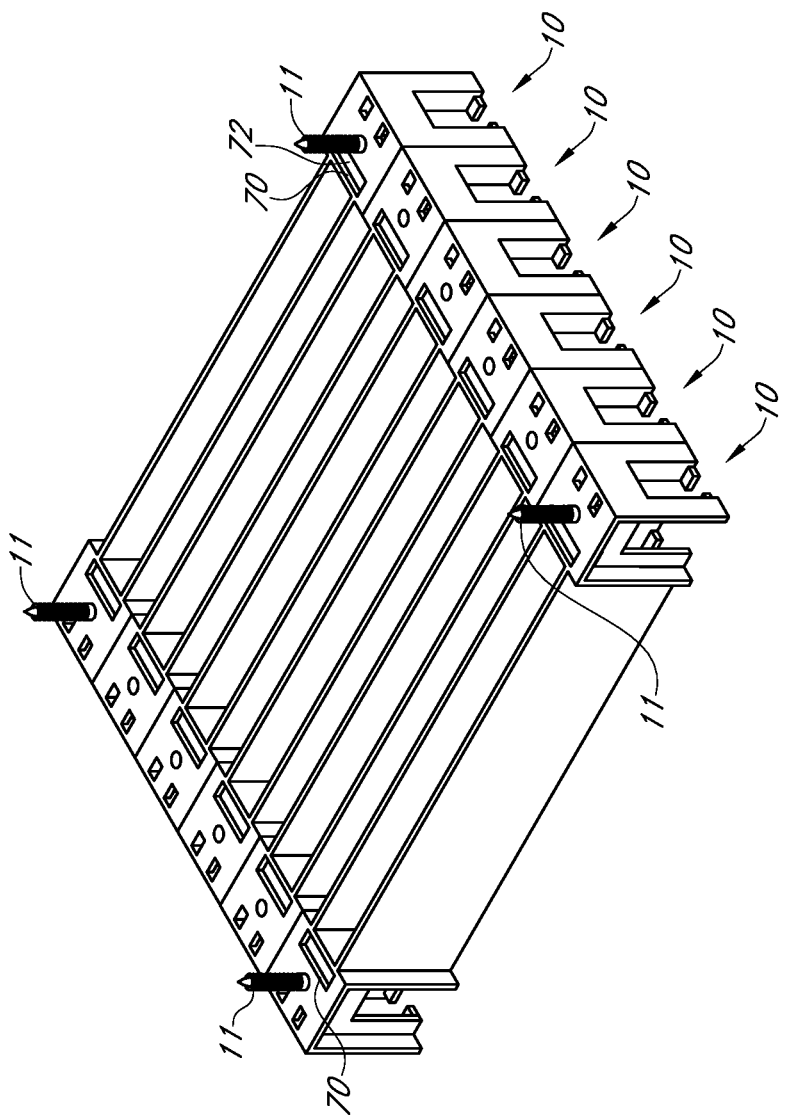
FIG. 10E is a perspective view of the embodiments of FIGS. 10A-10D wherein six sets of racks have been assembled and positioned on the pair of carrier rails via the top carrier rail slot and fasteners have been positioned in the fastener apertures of the end caps located at the corners of the assembled rack for engagement and securement with another structure (not shown).
Figures 1, 10E:
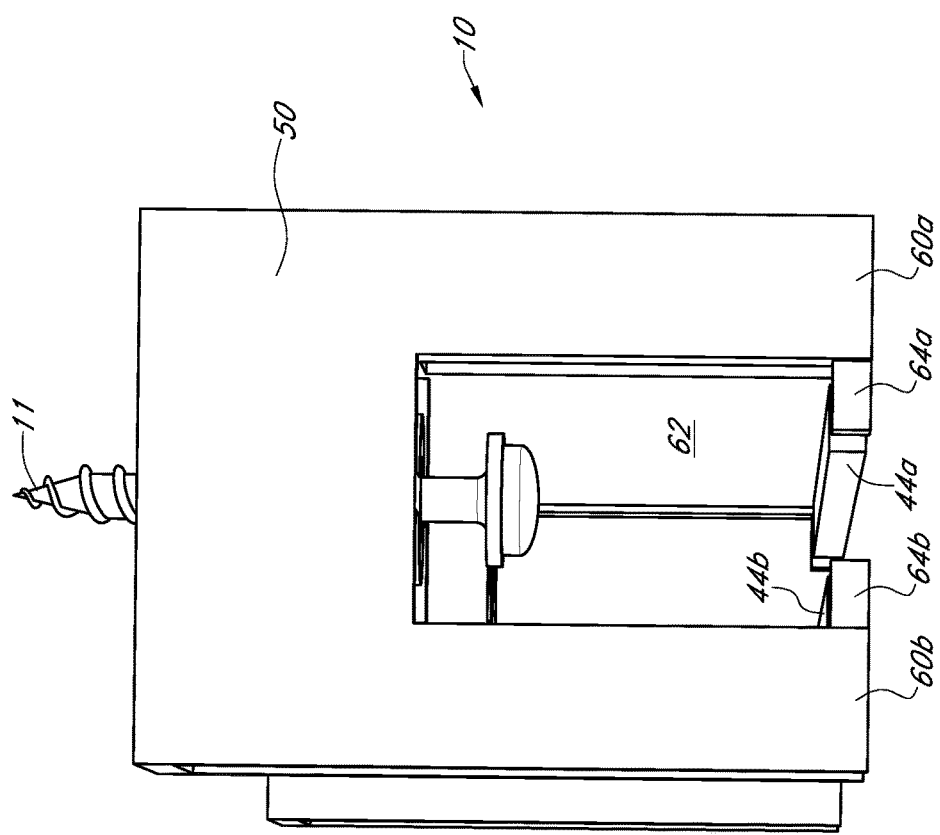

FIG. 10D is a perspective view as disclosed in FIGS. 10A-10C wherein six sets of racks 10 have been assembled and positioned on a pair of carrier rails 72 via the top carrier rail slot 70. FIG. 10E is a perspective view of the embodiments of FIGS. 10A-10D wherein six sets of racks 10 have been assembled and positioned on the pair of carrier rails 72 via the top carrier rail slot 72 and fasteners 11 have been positioned in the fastener apertures 12 of the retainer portions 50 located at the corners of the assembled rack 10 for engagement and securement with another structure (not shown). As shown, carrier rail aperture (slot) 70 and top carrier rails 72 are round. One of ordinary skill will appreciate that the specific pattern, dimensions, configuration, etc. of the features of the carrier rail aperture 70 and top carrier rail 72 may vary from one embodiment of the rack 10 to the next and are therefore in no way limiting to the scope of the rack 10 unless so indicated in the following claims.

As shown in FIGS. and 10E-11A, 1B and 2, the rack 10 is configured with multiple fastener apertures 11 which are basically formed to allow insertion and engagement with a fastener 12 therein to allow mounting of the rack 10 to any suitable surface which may include, but is not limited to, the underside of a shelf (Not shown) The specific pattern, dimensions, configuration, etc. of the features of the fastener apertures 12 may vary from one embodiment of the rack 10 to the next and are therefore in no way limiting to the scope of the rack 10 unless so indicated in the following claims.

The various elements of the rack 10 may be separately formed and later engaged with one another (e.g., via mechanical fasteners, material fusing, chemical adhesives, etc.) or integrally formed with one another having at least retainer opening 30, center portion 40 or retainer portion 50. The materials used to construct the rack 10 and various elements thereof will vary depending on the specific application of the rack 10, but it is contemplated that steel, aluminium, polymers, other synthetic materials, natural materials, and/or combinations thereof will be especially useful for some applications. Accordingly, the above-referenced elements may be constructed of any material known to those skilled in the art or later developed, which material is appropriate for the specific application of the rack 10, without departing from the spirit and scope of the rack 10 as disclosed and claimed herein.

Having described the preferred embodiments, other features of the rack 10 will undoubtedly occur to those versed in the art, as will numerous modifications and alterations in the embodiments as illustrated herein, all of which may be achieved without departing from the spirit and scope of the rack 10 disclosed herein. Accordingly, the methods and embodiments pictured and described herein are for illustrative purposes only, and the scope of the present disclosure extends to all method and/or structures for providing increased functionality, comfort, longevity, enjoyment and aesthetics in the use and access of re-sealable bags for storage. Furthermore, the methods and embodiments pictured and described herein are no way limiting to the scope of the rack 10 and method of use unless so stated in the following claims.

It should be noted that the rack 10 is not limited to the specific embodiments pictured and described herein, but is intended to apply to all similar apparatuses and methods for providing the various benefits and/or features of a rack 10. Modifications and alterations from the described embodiments will occur to those skilled in the art without departure from the spirit and scope of the rack 10. It is understood that the rack 10 as disclosed herein extends to all alternative combinations of one or more of the individual features mentioned, evident from the text and/or drawings, and/or inherently disclosed. All of these different combinations constitute various alternative aspects of the rack 10 and/or components thereof. The embodiments described herein explain the best modes known for practicing the rack 10 and/or components thereof and will enable others skilled in the art to utilize the same. The claims are to be construed to include alternative embodiments to the extent permitted by the prior art.

While the rack 10 has been described in connection with preferred embodiments and specific examples, it is not intended that the scope be limited to the particular embodiments set forth, as the embodiments herein are intended in all respects to be illustrative rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

What is claimed is:

1. A device for hanging a storage bag having a re-sealable mechanical seal, the device comprising:
   a) a clip having a generally elongate shape further comprising:
      1) a first clip arm having a first end and a second end; and,
      2) a second clip arm having a first end and a second end, wherein the first end of the first clip arm and the first end of the second arm are flexibly connected via a living hinge configured for an open position and a closed position, wherein proximate the second end of either the first clip arm or the second clip arm, a clip arm ridge is positioned and wherein a storage bag having a re-sealable mechanical seal is positioned between the first and second clip arms, with the clip arms positioned proximate to and under the mechanical re-sealable seal in the open position and the storage bag then enclosed by the clip in the closed position;
   b) a rack further comprising:
      1) a center portion having a body with a first end and a second end with an exterior defined by a pair of opposing parallel walls, a lower interior of the center portion defined by a pair of parallel inner opposing rails therein and an upper interior of the center portion open;
      2) a pair of retainer portions, each of the retainer portions having a body with a first end, a second end and a top surface, the first end formed as a wall with an inner opening therein, the wall connected to the center portion first end and forming the center portion's first end, the top surface connected to the wall and extending from the first end to the second end of the retainer portion wherein a pair of legs define an opening with a rail interiorly positioned at an end of the legs, the pair of legs defining a pair of outer opposing rails aligned with the inner opposing rails of the center portion, the opening between the pair of legs aligning with the open center portion wherein one retainer portion of the pair of retainer portions is positioned at each end of the center portion, and wherein at least one locking rail gap is positioned in at least one of either the outer opposing rails of the first or second retainer portions or the inner opposing rails of the center portion of the rack, the at least one locking rail gap configured to engage with the at least clip arm ridge; and,
   c) wherein the storage bag engaged in the clip in the closed position is positioned for slideable entry into the rack for storage and slideable exit for use, via the first retainer portion outer opposing rails, the opposing rails of the center portion and the second retainer outer opposing rails during use of the rack with the storage bag.

2. The device for hanging a storage bag having a re-sealable mechanical seal according to claim 1 wherein at least one fastener aperture is positioned in the retainer portions allowing attachment of the rack to another structure.

3. The device for hanging a storage bag having a re-sealable mechanical seal according to claim 1 wherein at least one top carrier aperture is transversely positioned in the retainer portions to allow insertion of a carrier rod thereby allowing multiple racks to be adjacently positioned.

4. A device for hanging a storage bag having a re-sealable mechanical seal, the device comprising:
   a) a clip having a generally elongate shape further comprising:
      1) a first clip arm having a first end and a second end; and,
      2) a second clip arm having a first end and a second end, wherein the first end of the first clip arm and the first end of the second arm are flexibly connected via a living hinge configured for an open position and a closed position, wherein proximate the second end of the first clip arm or the second clip arm, at least one clip arm ridge is positioned and wherein a storage bag having a re-sealable mechanical seal is positioned between the first and second clip arms, with the pair of clip arms positioned proximate to and under the mechanical re-sealable seal in the open position and the storage bag then enclosed by the pair of clip arms in the closed position;

b) a rack further comprising:
  1) a center portion having a body with a first end and a second end with an exterior defined by a pair of opposing parallel walls, a lower interior of the center portion defined by a pair of parallel inner opposing rails therein and an upper interior of the center portion open;
  2) a pair of retainer portions, each of the retainer portions having a body with a first end, a second end and a top surface, the first end formed as a wall with an inner opening therein, the wall connected to the center portion first end and forming the center portion's first end, the top surface connected to the wall and extending from the first end to the second end of the retainer portion wherein a pair of legs define an opening with a rail interiorly positioned at an end of the legs, the pair of legs defining a pair of outer opposing rails aligned with the inner opposing rails of the center portion, the opening between the pair of legs aligning with the open center portion wherein one retainer portion of the pair of retainer portions is positioned at each end of the center portion, and wherein at least one locking rail gap is positioned in at least one of either the outer opposing rails of the first or second retainer portions or the inner opposing rails of the center portion of the rack for engagement with the at least one clip arm ridge of either the first clip arm or the second clip arm; and,
  c) wherein the storage bag engaged in the clip in the closed position is positioned for slideable entry into the rack for storage, and slideable exit for use, via the first retainer portion outer opposing rails, the opposing rails of the center portion and the second retainer outer opposing rails during use of the rack with the storage bag.

5. The device for hanging a storage bag having a re-sealable mechanical seal according to claim 4 wherein the at least one locking ridge in the at least one clip arm and the at least locking gap positioned in either the outer opposing rails of the first or second retainer portions or the inner opposing rails of the center portion of the rack for engagement do not engage the storage bag having a re-sealable mechanical seal to be positioned therein.

6. The device for hanging a storage bag having a re-sealable mechanical seal according to claim 4 wherein the at least one locking ridge in the at least one clip arm is positioned on a lower side of the clip arm and the at least locking gap positioned in either the outer opposing rails of the first or second retainer portions or the inner opposing rails of the center portion of the rack for engagement is positioned in the upper side.

* * * * *